Sept. 15, 1936.  R. G. TURNER  2,054,180
WEFT DETECTING MECHANISM FOR MULTICOLOR SHUTTLE CHANGING LOOMS
Original Filed April 26, 1934  8 Sheets-Sheet 2

Inventor
Richard G. Turner
By Southgate Taylor Hawley
Attorneys

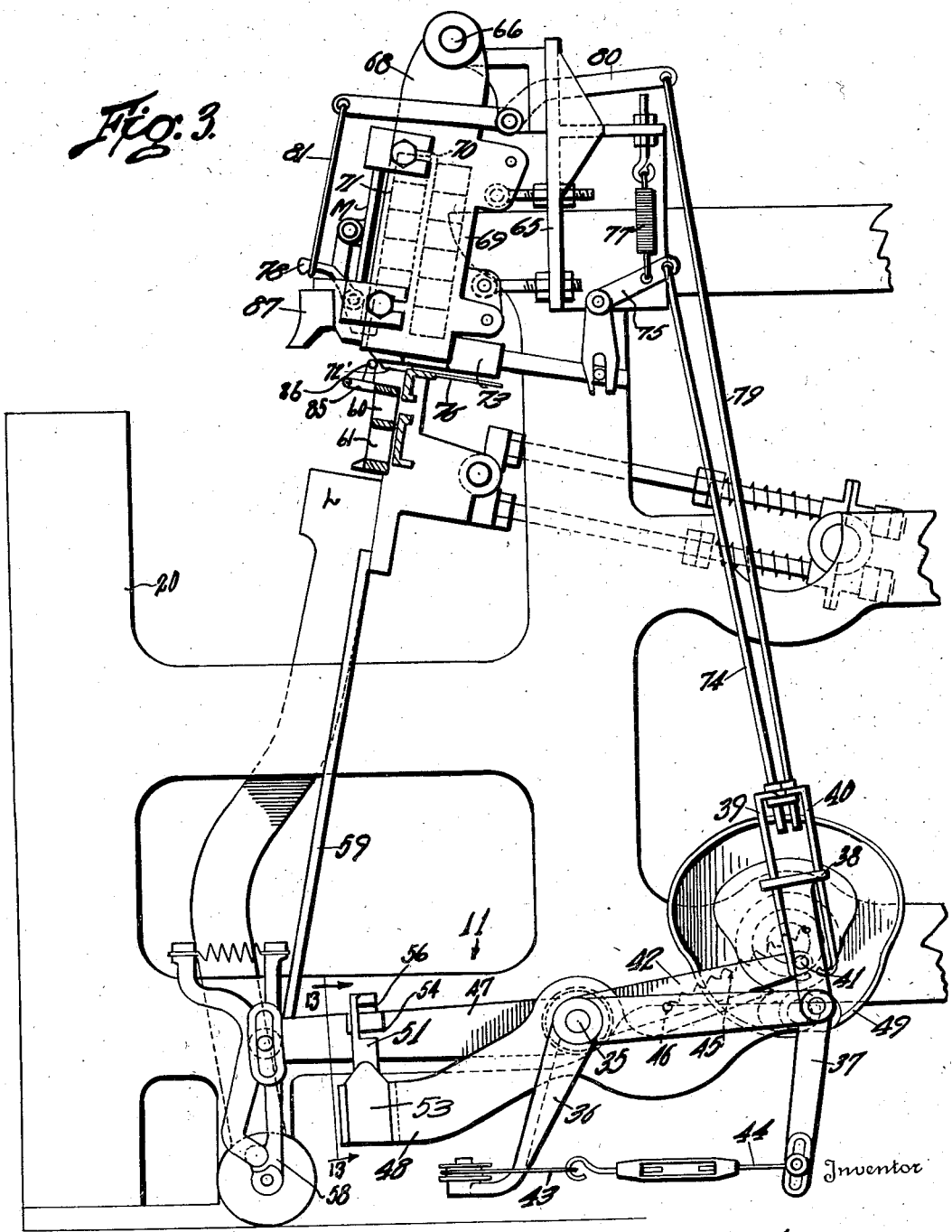

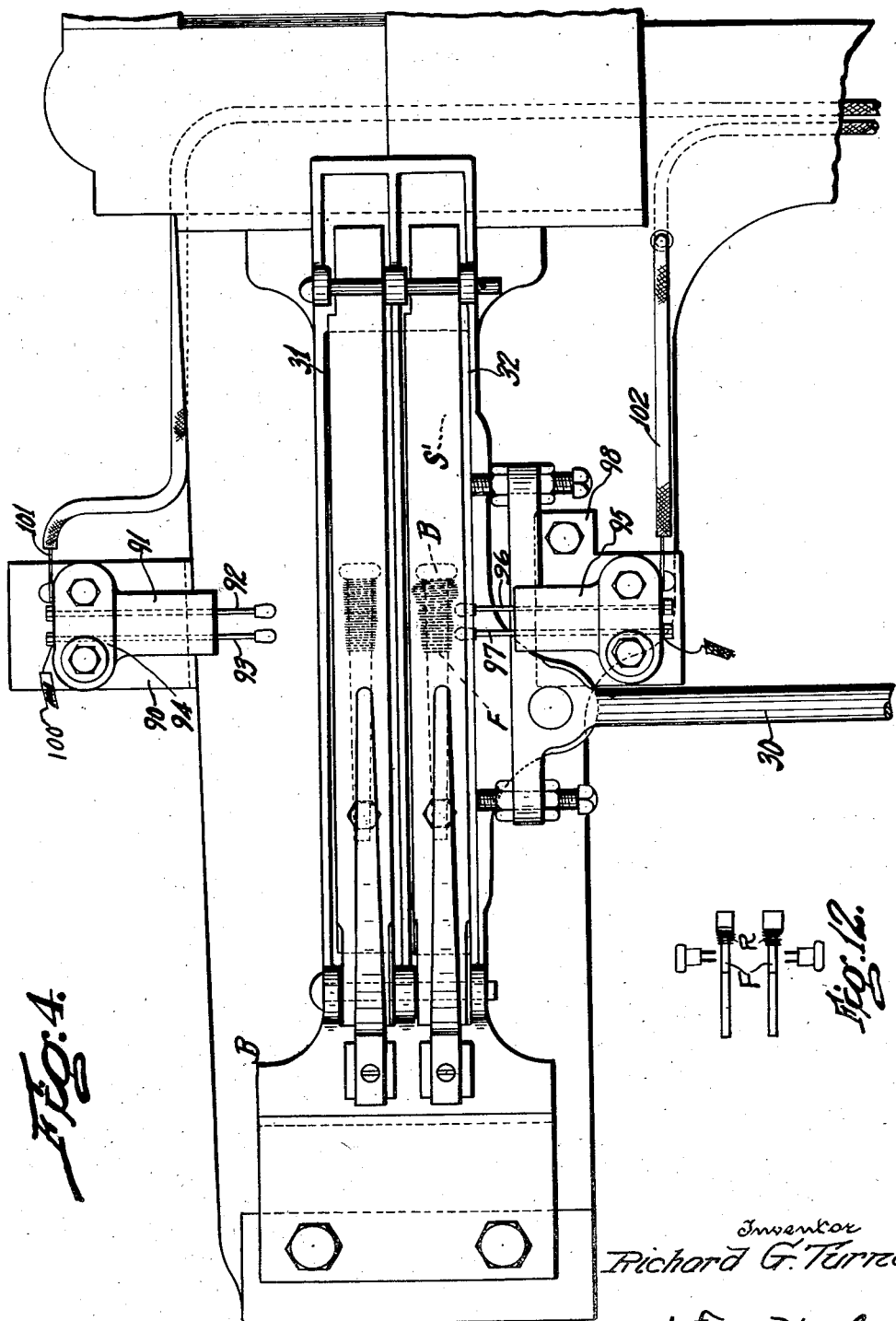

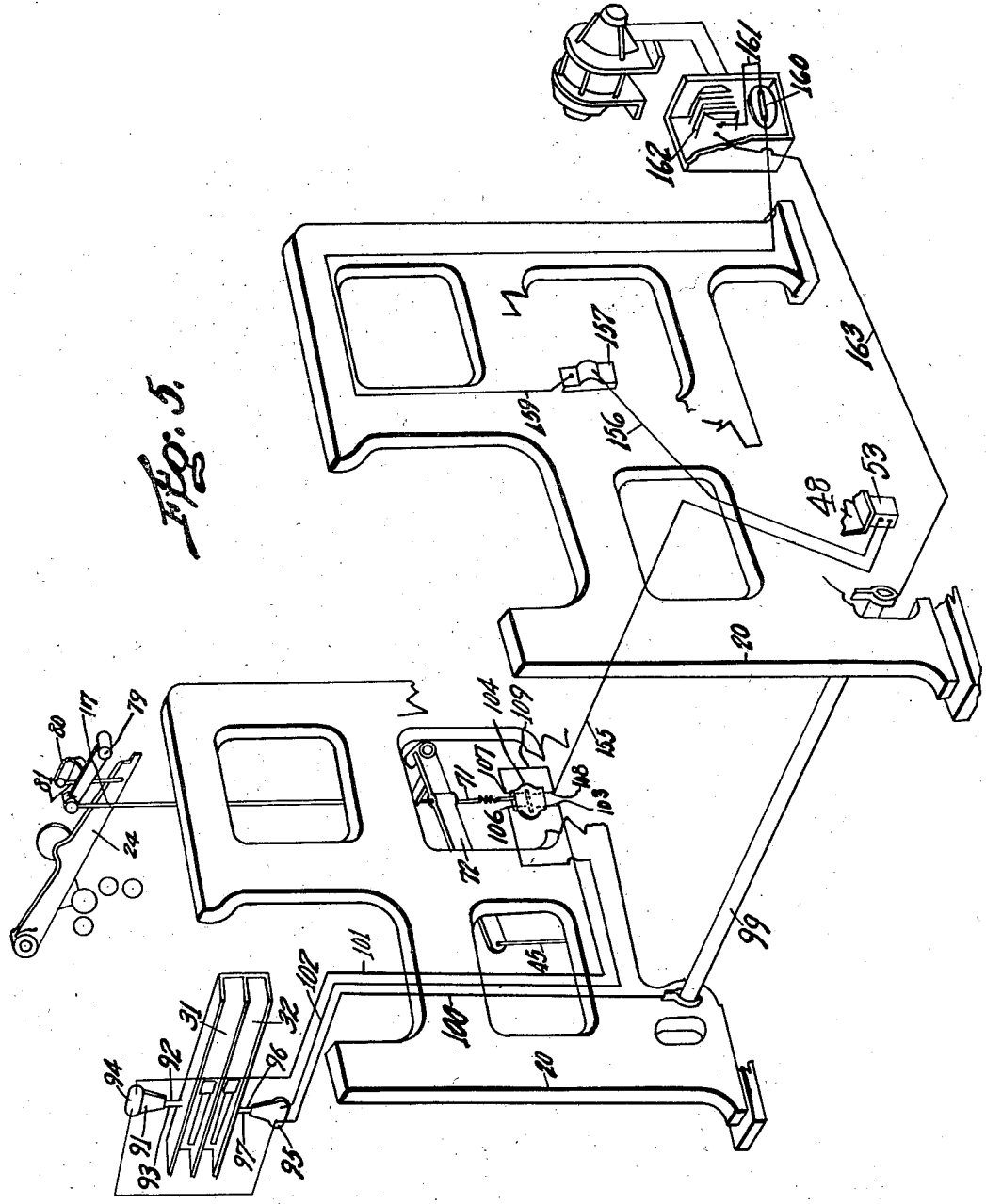

Sept. 15, 1936. R. G. TURNER 2,054,180
WEFT DETECTING MECHANISM FOR MULTICOLOR SHUTTLE CHANGING LOOMS
Original Filed April 26, 1934 8 Sheets-Sheet 6
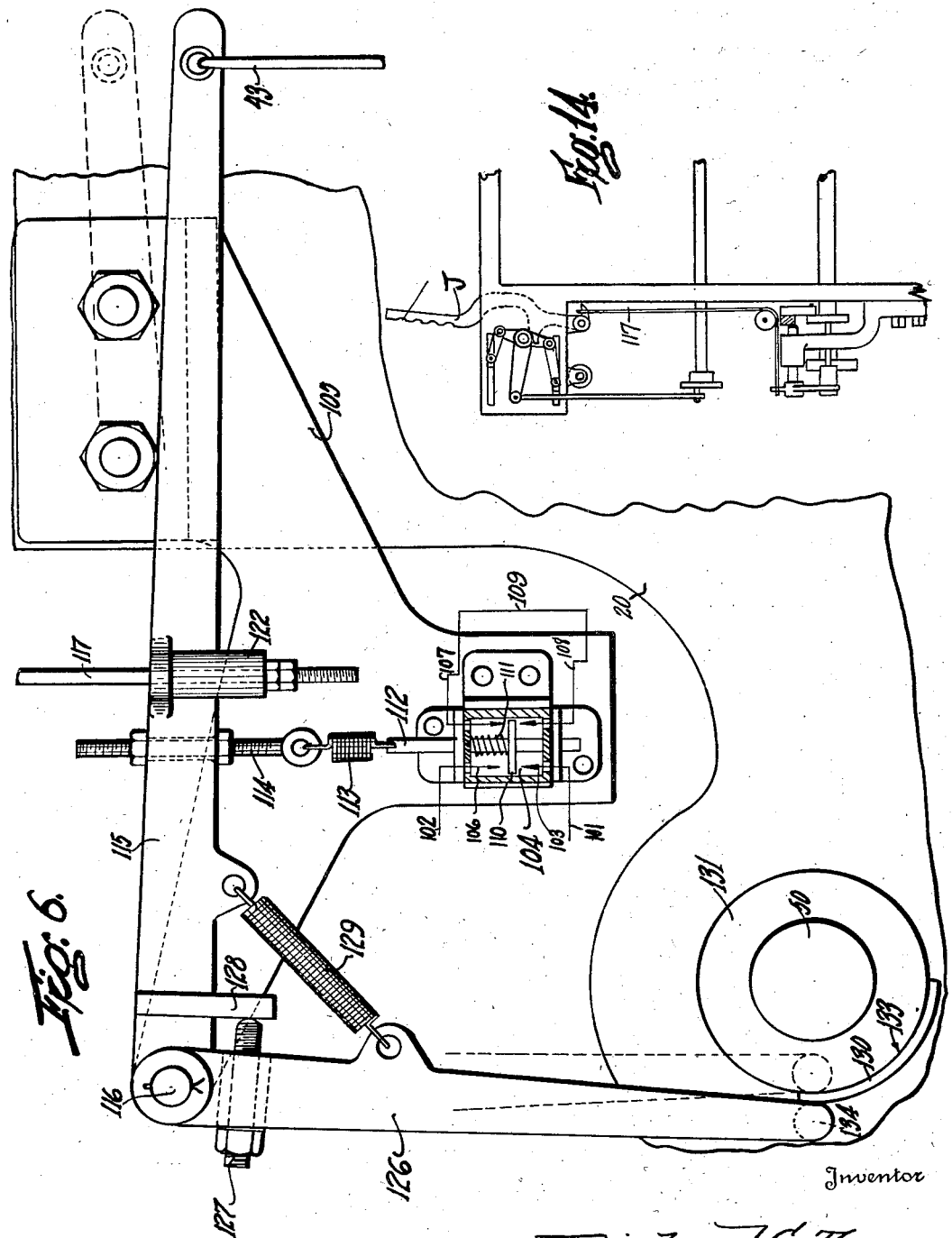
Inventor
Rickard G. Turner.
By Southgate Fay & Hawley
Attorneys

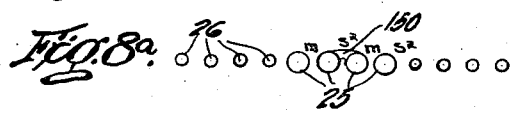
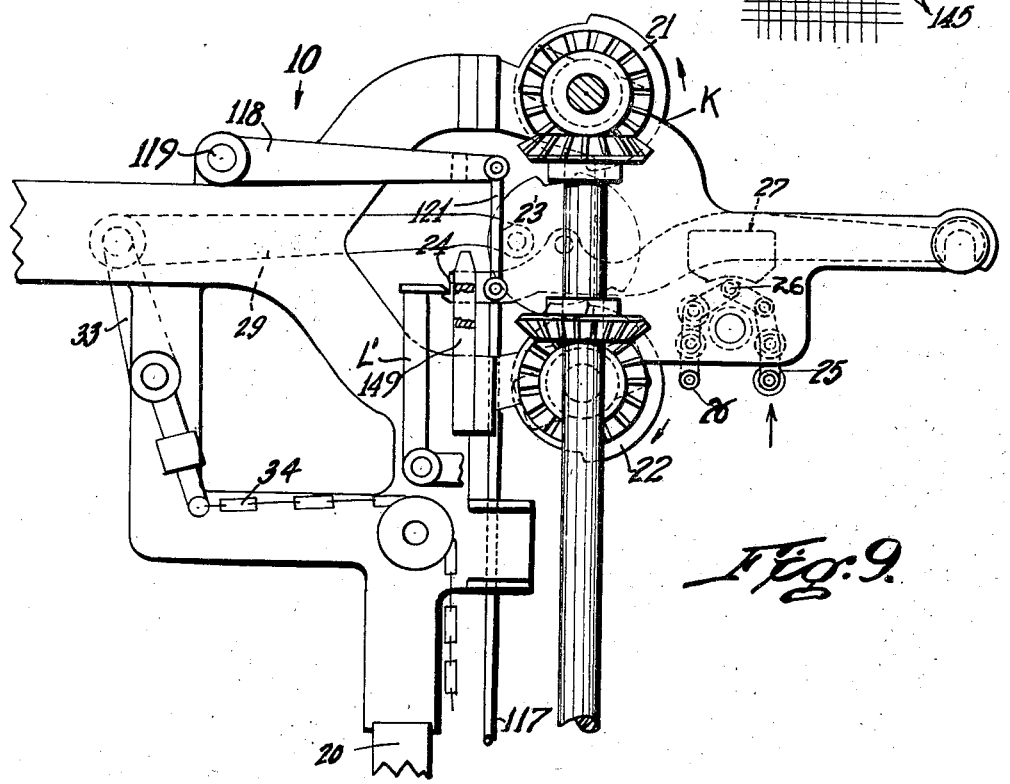
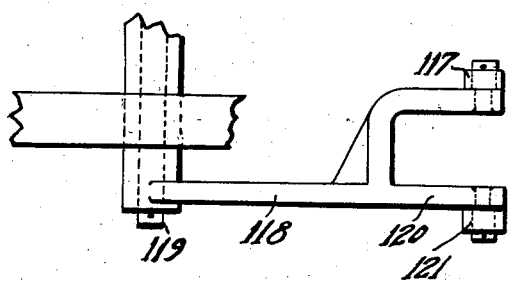

Sept. 15, 1936.　　　　R. G. TURNER　　　　2,054,180
WEFT DETECTING MECHANISM FOR MULTICOLOR SHUTTLE CHANGING LOOMS
Original Filed April 26, 1934　　8 Sheets—Sheet 8
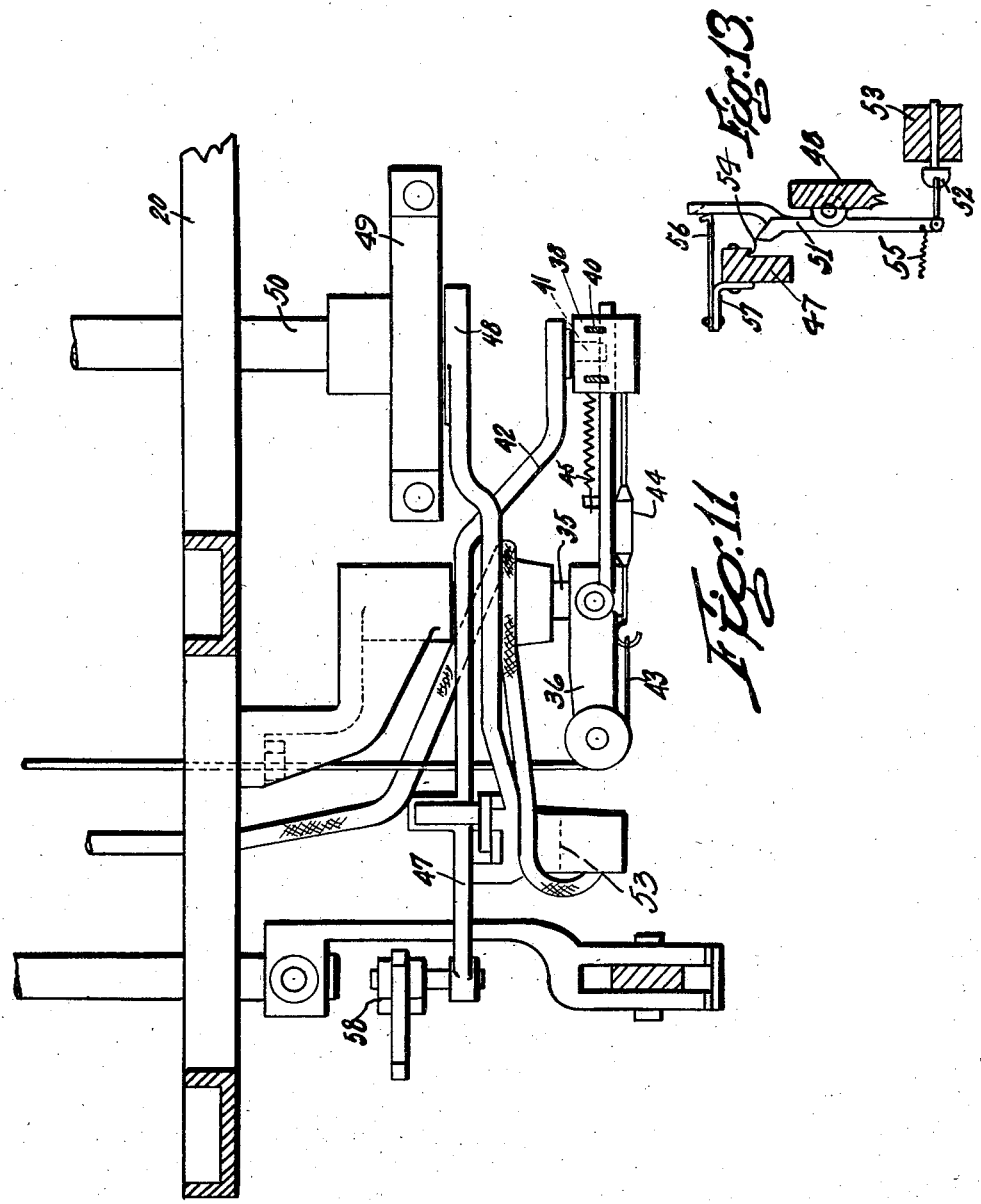
Inventor
Richard G. Turner.
By Southgate Hays Hawley
Attorneys Patented Sept. 15, 1936

2,054,180

UNITED STATES PATENT OFFICE 2,054,180

WEFT DETECTING MECHANISM FOR MULTICOLOR SHUTTLE CHANGING LOOMS

Richard Greenleaf Turner, Worcester, Mass., assignor to Crompton & Knowles Loom Works, Worcester, Mass., a corporation of Massachusetts Original application April 26, 1934, Serial No. 722,549. Divided and this application March 11, 1935, Serial No. 10,428

9 Claims. (Cl. 139—233)

This invention relates to weft detecting and loom control mechanism adapted more particularly to multicolor shuttle changing looms and is a division of my prior application, Serial No. 722,549, filed April 26, 1934.

In copending application Serial No. 593,814 there is set forth an electrical weft detecting mechanism having one feeler over the drop boxes to coact with the top shuttle and another feeler under the drop boxes to coact with the bottom shuttle, both of the feelers being fixed to the lay and their ability to detect weft exhaustion being dependent upon movement of the boxes. In that application a mechanically moving actuator having a regular movement every other beat of the loom is employed, and operates in such a way that the detector mechanism is limited to the weaving of fabrics having two picks of one color alternated with two picks of another color. The detectors are placed so that they contact with the inactive shuttle and are always out of contact with the active shuttle.

It is desirable to be able to employ the detecting mechanism shown in the aforesaid application for the weaving of fabrics having cross stripes with more than two picks of the same color and in the present embodiment of my invention I interpose a control between this type of detector mechanism and the magazine, operative to delay the indication to the magazine until the inactive exhausted shuttle is about to return to action, regardless of the width of the stripe woven by the active shuttle.

With my improvements the running shuttle will not be detected while active and provision should be made to prevent it from becoming exhausted while active. It is a further object of my invention to operate according to a method which will provide a bunch in each shuttle sufficiently large to weave a complete stripe during any one period of action, plus the reserve added for safety consideration. Assuming, as an example, that the minimum reserve without regard to the length of the repeat will be three picks and that the cloth woven has six picks of one color followed by six picks of another color, each bobbin will carry a bunch sufficient for nine picks. With a reserve of this size a shuttle which is returned to action may have its normal supply exhausted during the first part of the first pick if it is active, but enough reserve yarn will remain to permit the shuttle to complete its repeat and then move out of action, when it will immediately give indication of exhaustion, after which upon being returned to action a second time one pick corresponding to the single flight from the drop box end to the magazine end will be drawn from the reserve of three picks.

The so-called Knowles head for actuating the harnesses from the shuttle boxes includes in its construction a chain having high and low balls which pass under vibrator levers. This chain is given a continuous motion as the result of which the vibrators are likely to shake slightly when passing from one ball to another. Since one of the switches in the circuit to be described hereinafter, and also the color selector for the magazine, are both actuated directly from the vibrator, it is desirable to prevent this shaking of the lever as the chain moves.

It is accordingly an important object of my present invention to provide means to prevent vibration of the vibrator lever under the described conditions, to the end that a Knowles head can be used in connection with a multicolor shuttle changing loom without danger of losing an indication at the switch or giving a misindication at the color selector. Two different means for accomplishing this result are illustrated herein, namely, a lever and cam arrangement, and a special pattern chain link.

My invention further relates to arrangements and combinations of parts which will be hereinafter described and more particularly pointed out in the appended claims.

In the accompanying drawings wherein a convenient embodiment of my invention is set forth, Fig. 1 is a front elevation of a loom made according to my present invention and having over and under feelers together with a Knowles head;

Figs. 2 and 3 are side elevations on an enlarged scale, looking in the direction of arrow 2 and 3, respectively in Fig. 1;

Fig. 4 is a front elevation on an enlarged scale of the weft detector and shuttle box mechanism shown at the left of Fig. 1;

Fig. 5 is a perspective diagrammatic view of the operating parts of the mechanism, showing the circuits;

Fig. 6 is an enlarged detailed side elevation of the structure shown at the lower part of Fig. 2;

Figs. 7 and 8 are diagrammatic views showing two types of fabrics which can be woven with my invention;

Figure 1:
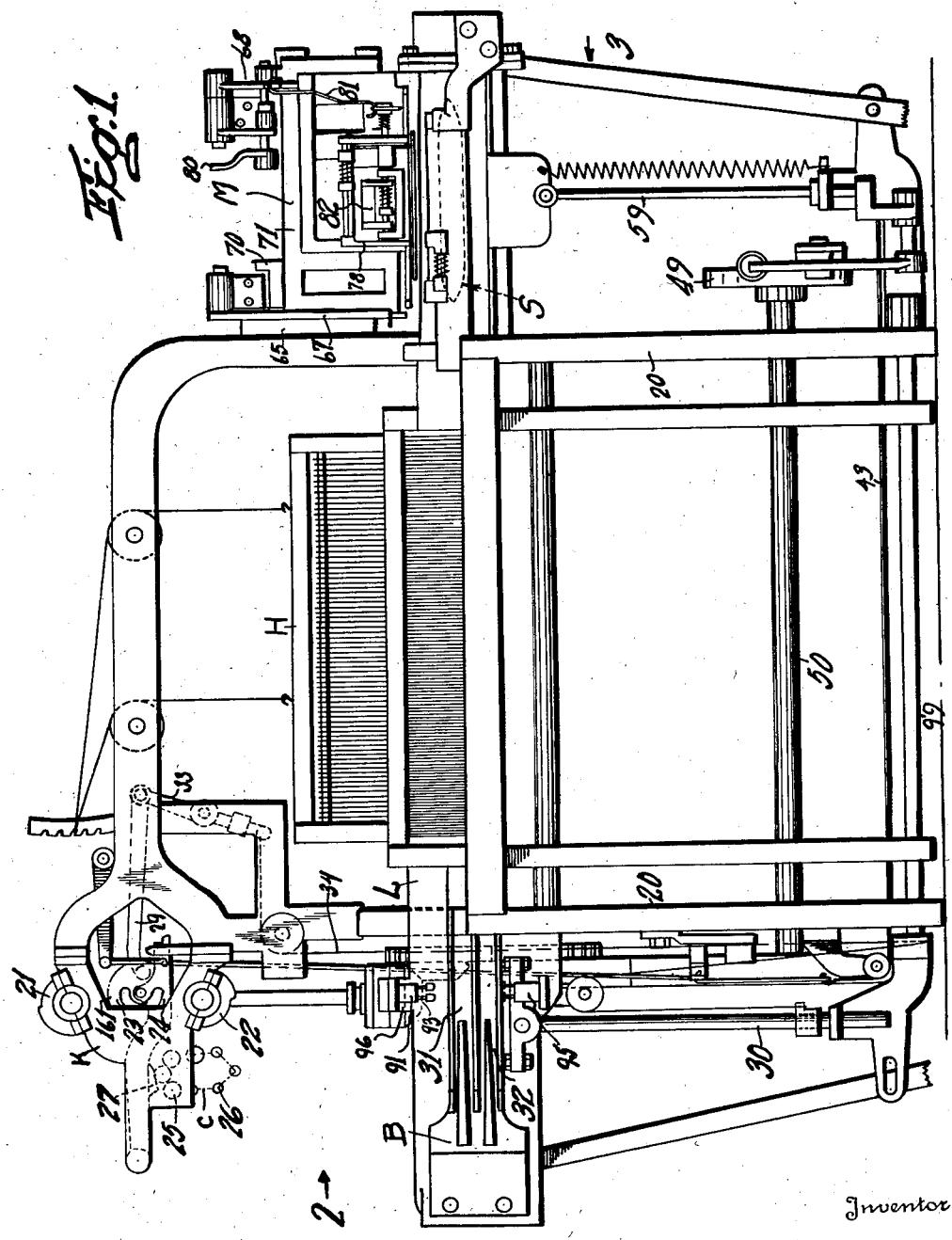

Fig. 7ª is a diagrammatic view indicating a chain to be used in weaving the fabric shown in Fig. 7;

Fig. 8ª is a similar view indicating a chain to be used in weaving the fabric shown in Fig. 8;

Fig. 9 is a rear elevation of the upper left-hand part of Fig. 1, showing a pattern chain corresponding to Fig. 7a;

Fig. 10 is a detailed plan view of the lever which is actuated by the vibrator for the boxes, looking in the direction of the arrow 10 in Fig. 9;

Fig. 11 is a detail plan on an enlarged scale of parts shown in the lower part of Fig. 3, and looking in the direction of the arrow 11 in Fig. 3;

Fig. 12 is a diagrammatic view showing the relation of the detectors to two bobbins which are depleted except for their reserve bunches;

Fig. 13 is a detail vertical section on the line 13—13 in Fig. 3, and

Fig. 14 is a diagrammatic view similar to a portion of Fig. 1 but showing a dobby to control the box motion.

Referring to Fig. 1 of the drawings, the loom frame 20 supports at the upper left-hand end thereof a Knowles head motion K and has a lay L, at the left hand end of which is mounted the shifting shuttle box structure B. At the opposite or right-hand end of the loom is a magazine M which is, in the present instance, arranged to supply reserve shuttles of two distinctive kinds.

Figure 2:
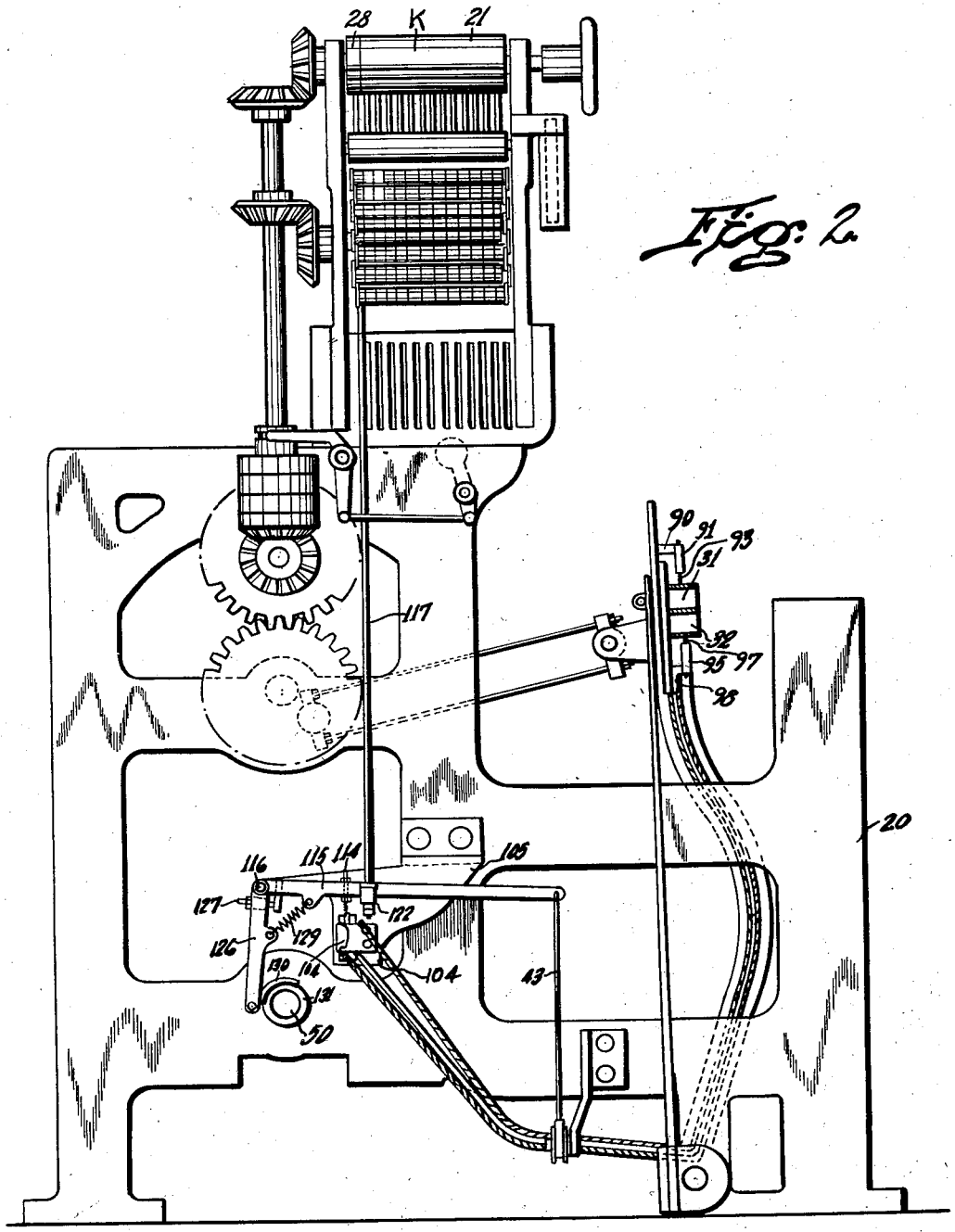

As shown in Figs. 1 and 2, the head motion comprises upper and lower cylinders 21 and 22, respectively, between which lie vibrator gears 23 mounted on vibrator levers 24. The latter in the preferred form of the invention may be positioned by the ordinary chain indicated at C as comprising risers or large rolls or balls 25 and sinkers or small rolls or balls 26 on which rest the runs 27 of the vibrators. These vibrators control the harness mechanism H and the rear vibrator controls the drop boxes to be described. As shown here, a section 28 is added to each main cylinder to actuate the box vibrator and permit adjustments relative to the harnesses. In certain types of heads there is a separate box section, but in either form there will be a vibrator lever to control the boxes.

A box lifter rod 30 supports upper and lower shifting shuttle box cells 31 and 32, respectively. The rear vibrator gear has a connector 29 (Fig. 9) attached to a box lever 33 from which extends a lifter chain 34 trained around appropriate sheaves and connected to the lifter rod 30 (Fig. 1). It is sufficient for the purposes of the present description to state that the balls on the box chain move the vibrator gears into engagement with one or the other of the cylinders to be rotated for the purpose of actuating the lever 33 to raise or lower the shuttle boxes. These connections are old, and may be as more fully set forth in Patent No. 837,284, simplified to operate two shifting boxes.

A fixed stud 35 (Fig. 3) has secured thereto a bracket 36 on the horizontal arm of which is pivoted a selector lever 37 having a guide head 38. Front and back selector hooks 39 and 40, respectively, pass through the head and are positioned one at a time in the path of a downwardly movable atuator pin 41 carried by an actuator lever 42 movable about the stud 35. A flexible link 43 is attached to the selector lever by an adjustable connection 44 and acts to move the guide head rearwardly, or to the right in Fig. 3, against the action of spring 45. The latter extends between a lug 46 on the bracket and the upper part of lever 37, and tends to move the guide head forwardly to place rear hook 40 in the path of actuator pin 41. The guide head is in this way controlled to place either hook operatively with respect to the actuator.

The forward arm 47 of lever 42 is adapted for occasional connection with a periodically rocking lever 48 which is driven during loom operation by a cam 49 on the bottom shaft 50 of the loom. A lifter latch 51 is pivoted to lever 48, see Fig. 13, and is connected at its lower end to the core 52 of a solenoid 53 carried by the rocking lever 48. A notched overhang 54 on the forward arm 47 of actuator lever 42 is normally cleared by the latch 51 when the solenoid is deenergized, a light spring 55 holding the latch in normal inoperative position as shown in Fig. 13. When the solenoid is energized, the latch moves under the notched overhang and is held in that position by a hooked spring 56 supported on a small sheet metal clip 57 bolted to lever 42. The spring holds the latch in its operating position before the rocking lever starts to rise and independently of continued action of the solenoid. When the latch moves up it will free itself from the spring hook and then engage the overhang 54. The sequence of operations is rapid and the latch does not have time to move away from the overhang before engaging it. On the down stroke the latch is free to move back to normal idle position when pulling away from the overhang. The hooked spring is further described and claimed in my copending continuation application Serial No. 747,358.

A two part yielding lifter link 58 (Fig. 3) is suspended from the front of lever 42 and is attached to the lower end of a box lifter rod 59 normally in down position. Upper and lower transfer shuttle boxes 60 and 61, respectively, are supported by the upper end of the rod 59. The boxes are similar in their shuttle changing movements to those shown in Patent No. 1,834,302, and in my copending application Serial No. 460,746.

The magazine M is arranged to supply reserve shuttles containing two different kinds of weft. A bracket 65 (Fig. 3) projecting laterally from the loom frame holds the magazine by means of supports 66 extending forwardly from the bracket and attached to inner and outer end plates 67 and 68, respectively. A back wall 69, partition 70, and front wall 71, provide two spaced compartments or guideways for the stacks of reserve shuttles.

The bottom shuttle of the rear stack is supported on a fixed plate 72 immediately in front of a plunger 73 normally in rear position. When hook 39 is depressed, a link 74 connected thereto will rock lever 75 clockwise to advance the plunger toward the front, or left in Fig. 3. The bottom rear shuttle is thereupon moved into a compartment under the front shuttles and falls on arms 76 secured to and extending rearwardly from the lay. As the latter moves backwardly, the shuttle falls off the arms 76 and into the top box 60, which has been raised to receive it. The plunger is thereafter moved back to normal position by spring 77. This mode of transfer and of utilizing the arms 76 is set forth and claimed in my copending application Serial No. 560,573.

The bottom shuttle of the front stack rests on a finger 78 pivoted on the front magazine wall and held yieldingly in shuttle supporting position. When hook 40 is depressed a link 79 connected to it rocks lever 80 to lift a shorter link 81 attached to the finger 78, removing the latter to permit the lowest front reserve shuttle to fall into the compartment and on the support arms 76. Transfer to raised box 60 then follows substantially as already described for the rear shuttles. The superposed front reserve shuttles are held up by a friction pad 82 (Fig. 1) which presses against the next to the bottom front shuttle to support the stack when the lowest shuttle falls. When finger 78 rocks clockwise, Fig. 3, the pad 82, which is normally held yieldingly forward, is pushed back by spring action to hold the upper shuttles. At transfer the cover 85 of box 60 is raised by rod 59 when the lay moves rearwardly and a lug 86 on the cover engages a fixed cam 87 on the magazine to pivot the cover upwardly so the shuttles can enter the box 60.

The matter thus far described may be substantially as described in the aforesaid applications, and of itself forms no part of my present invention.

In carrying my invention into effect I provide weft detecting mechanism at the head or drop box end of the loom such as is shown more particularly in Figs. 1, 2, 4 and 5. Secured to and extending upwardly from the lay is a bracket 90 having fastened thereto an electric detector 91 provided with two wire feelers 92 and 93, respectively, which are electrically insulated from each other, preferably by being mounted in a carrier the body of which 94 is formed of insulating material. In a similar way the lower detector 95 may have similar wires 96 and 97 and is fastened to a depending bracket 98 secured to the lay.

These detectors are so positioned that when the shuttle boxes are down in the position shown in Fig. 4 the feeler wires of the lower detector are positioned to detect the condition of weft in the bottom shuttle B', with the upper detector wires out of the path of the top shuttle B, which is temporarily active and may be at the opposite end of the loom as shown in Fig. 1. When the shuttle boxes shift upwardly the lower shuttle becomes active and moves away from the bottom detector, while at the same time the top shuttle is rendered inactive and presents its weft supply to the wires of the upper feeler. The detectors are fastened to the lay and are rendered capable of detecting weft presence by the shifting of the boxes effected through the box rod 30. The detectors themselves may be made as shown in Payne Patent No. 1,924,197.

The feeler wires 93 and 97 are preferably grounded to a cross bar 99 (Fig. 5) of the loom frame by wire 100. The feeler wires 92 and 96 are electrically connected with conductor wires 101 and 102, respectively. As shown in Figs. 5 and 6, wire 101 leads to the bottom left electrode 103 of a two-pole switch 104 mounted on a bracket 105 on the loom frame, while wire 102 from the bottom detector is connected to the top left electrode 106 of the two-pole switch. The top and bottom right-hand electrodes 107 and 108, respectively, are connected by a wire 109 (Fig. 5). A pole piece 110 is normally urged down by a light spring 111 (Fig. 6) around a stem 112, and a heavy spring 113 is attached to the stem to raise the pole piece against the upper contacts 106 and 107, overpowering the light spring. An adjustable screw eye 114 is connected to spring 113 and threaded into a lever 115 pivoted to a stud 116 on bracket 105.

Lever 115 is positioned by the vibrator 24 for the boxes through the connections shown in Figs. 5, 6 and 9, wherein there is illustrated one form of mechanism to maintain the indication free from undesirable vibration as the pattern chain presents successive high balls under the lever 24. The flexible link 43 (Figs. 3 and 6) is connected to the outer end of lever 115, while there extends downwardly through a part of said lever a lifting rod 117, the upper end of which is connected to a lever 118 (Figs. 5, 9 and 10) pivoted as at 119 to a fixed part of the loom.

The lever 118 has an arm 120 attached to a link 121 connected to the vibrator lever 24. When the vibrator is down, rod 117 drops so that an adjustable lifting collar 122 (Fig. 6) thereon will permit downward movement of the lever 115. When the vibrator is lifted to the position shown in Fig. 1 by engaging a high ball, the rod 117 lifts the lever 115. When lever 115 is down, the light spring 111 causes the pole piece to connect electrodes 103 and 108, but when the lever is up the pole piece is raised by the heavy spring to connect electrodes 106 and 107.

It is desirable that the pole piece maintain its contacts and the lever 37 hold the hooks 39 and 40 without fluttering or unnecessary vibration, so that the circuits and magazine controls may be certain in their action. When employing the usual Knowles head pattern chain I accomplish this result by an additional lever 126 (Fig. 6) pivoted on stud 116 and having a stop screw 127 held against a stop lug 128 on lever 115 by tension spring 129. The lower end of lever 126 coacts with a cylindrical segment 130 secured to a hub 131 fast on the bottom shaft 50 of the loom. The segment 130 is concentric with the shaft and has an inner surface 133 (Fig. 6) to position a lug 134 on the lower end of lever 126.

The pattern mechanism is so timed with respect to the segment that when one high ball is passing from under the vibrator lever and another is approaching it, a condition which is likely to result in a slight dipping of the vibrator lever, the surface 133 will move by rotation of the bottom shaft into holding relation with respect to the lug 134. Under these conditions levers 115 and 126 are in the dotted line position shown in Fig. 6, with link 43 and spring 113 tensioned. Any downward pull on lever 115 will be transmitted through lug 128, screw 127 and lug 135 to segment 130 and be resisted by the latter to prevent fluttering or shaking of pole piece 110 and the selector hooks. The pattern chain is timed so that it moves the vibrator lever upwardly, or permits its descent, during those times when the segment 130 is away from lug 134.

In Figs. 6 and 7 I show two types of weaves which can be produced by the loom disclosed herein, the first of these in Fig. 7 comprising a four-pick repeat, two picks of which as at 140 may be of one color while the following two picks shown at 141 may be of a different color, these two pairs occurring in alternation throughout the fabric. This is the type of weave employed in making crepe and requires that the shuttle boxes shift every second pick of the loom.

When weaving this so-called 2 and 2 pattern the pattern chain will be built as shown in Fig. 7ᵃ and is composed of two low balls 26 alternated with two high balls 25. The segment 130 is operatively related to lever 115 during the time that control of the vibrator lever is passing from one high ball to another high ball, but it is not operative while the vibrator control is passing from a low to a high ball, or vice versa. In other words, segment 130 is operative on alternate beats only, and not on intermediate picks when the vibrator is subject to shift by the pattern chain. This alternate pick relation is obtained by having the segment on the bottom, or two pick, shaft 50.

My invention is not restricted to 2 and 2 weaving, however, and I may weave a fabric having wider bands or stripes. As an example, Fig. 8 shows a 4 and 4 pick weave, where the repeat is eight picks, four weft threads 144 of one color being followed by four threads 145 of a different color. Such a pattern would be woven by the chain assembled as shown in Fig. 8ª, where a series of four low balls 26 is followed by another series of four high balls 25. The segment 130 will take care of the spaces $m$ and $m$ between the first and second, and third and fourth high balls, reading left to right in Fig. 8ª, but it will not operate when the space $s^2$ passes under the vibrator since this is the point in the chain where a shift of control from high to low or vice versa, would or could occur if the repeat were different.

In order to prevent fluttering at such a time, that is, when space 52 is under the vibrator, I use the form of link shown in Holmes Patent No. 1,953,652, and designated herein at 150 (Fig. 8ª). In this way the lever 115 and pole piece are maintained without objectionable vibration throughout the time that the vibrator is raised by a series of high balls.

No serious fluttering occurs when the vibrator is down, since at such times the vibrator usually rests on a fixed part 149 (Fig. 9) of the head frame rather than on the low balls. At these times there is no need for moving the lug 134 into operative relation with the segment nor is there any force tending to disturb the lever 115, since springs 45 and 111 both act to lower it, and spring 113 is slack.

Inasmuch as the active shuttle is out of contact with its detector during the period of its activity, a bunch R (Fig. 12) of reserve weft is provided sufficiently large to permit the active shuttle to weave its block of color. The weft supply of a shuttle returning to action may become depleted, except for the bunch, during the first part of the first flight of the series of picks during which the shuttle is to remain active, and the weft for the remainder of the stripe must be drawn from the bunch. The wider the stripe the larger the bunch and in practice I believe it will be sufficient if the bunch is large enough to provide for a number of shuttle flights equal to the number of picks in a stripe plus three and one-half or four extra picks.

The stripes need not all contain the same number of picks, and should one stripe be narrower than the other the shuttles will carry reserve bunches corresponding to the widths of the stripes which they weave. The weft detectors are positioned to contact with metallic ferrules F on the weft carriers which lie to one side of the bunches as shown in Fig. 12.

In describing the operation of the loom it may be assumed that the boxes are down with the inactive boxed shuttle depleted, having just moved to that position so that the upper shuttle has been rendered active, and that the pattern being woven is that shown in Fig. 7. The Knowles head is usually so operated that the box vibrator will be up when the boxes are raised and will be down when they are lowered. The positions assumed therefore correspond to those shown in Figs. 4, 5, and 6 and 9.

Referring to Fig. 9, where the pattern chain is indicated as moving in a counter-clockwise direction, the first of the pair of low balls 26 has moved under the vibrator lever and the latter has therefore dropped. By the previously described parts, the drop boxes and lever 115 are down and the pole piece 110 is in contacting relation with electrodes 103 and 108. By referring to Fig. 5 it will be seen that electrode 103 is connected by wire 101 to the upper feeler and that the electrode 106 which corresponds to the lower feeler is temporarily disconnected from electrode 107. The fact that the bottom bobbin B in Fig. 4 has its weft supply exhausted results in electric contact between the wires 96 and 97 through the ferrule F, but no circuit can be completed because the electrode 106 corresponding to the bottom ferrule is out of circuit. This condition will exist so long as the pattern chain does not alter the position of the vibrator lever, that is, no current flows through the prongs of the lower detector when they first strike the bare ferrule, nor for a period of time thereafter.

When the time arrives for a shift of the boxes, however, a high ball will appear under the vibrator and raise the latter to a position such as that indicated in Fig. 1. This results in an upward movement of lever 118 and link 117 the effect of which is to raise lever 115, thereby lifting the pole piece 110 so that the latter will electrically connect the electrodes 106 and 107. It is to be understood that the raising of the vibrator lever and pole piece take place in preparation of the box shift and therefore at a time when the bottom feeler is still in contact with the bare ferrule. The following circuit is therefore closed: Current will flow from one side of the transformer 162 (Fig. 5) through wire 163, to a ground on the cross bar 99, up from the latter over wire 100 to prong 97, through the ferrule F to the other prong 96, thence by a wire 102 to electrode 106, through the pole piece 110 to electrode 107, through wires 109 and 155 to the solenoid 53, wire 156, switch 157, wire 159, fuse 160 and wire 161 back to the transformer 162. Current flowing in this circuit will cause the solenoid 53 (Fig. 13) to attract its core 57 so that the latch 51 will be rocked to a position under the overhang 54 and the hook 56 will have temporary holding relation therewith.

The immediately subsequent upward movement of lever 48 will result in lifting of the forward end of lever 42 to move the boxes at the magazine end of the loom from low to high position preparatory to shuttle change and will also result in depression of actuator 41, causing the latter to cooperate with hook 39 and advance a shuttle from the rear stack in the magazine. The head motion is so timed that the vibrator lever moves to its high position, the lock knife L' (Fig. 9) moves to locking position and the vibrator gear starts its rotation all before the drop boxes move. When the boxes start to rise, the wire prongs of the lower detector will follow the bottom shuttle up a fraction of an inch, and there is therefore enough time for the solenoid to be energized and to attract its core. The latch 51 is caught under the overhang before the spring hook 56 is disengaged from it and the movement of levers 42 and 48 to effect a shuttle change operation is not interfered with by the subsequent breaking of the previously traced circuit when the bottom shuttle moves away from the wires of the bottom feeler. Switch 157 (Fig. 5) is controlled by the shipper mechanism 158 of the loom, the switch being closed only when the loom is running.

When operated with a pattern having a longer repeat, the operation will be substantially as already described except that the time interval during which the pole piece remains in raised or lowered position will be longer, depending upon the number of picks in the weft stripes. Whatever the length of a repeat, the circuit through a ferrule of an empty shuttle will not be completed until just before the empty inactive shuttle is to be returned to active position. The bunch of reserve weft is so placed as not to interfere with the action of the feelers.

It will be understood that should depletion occur in the upper shuttle when the top box is raised, a circuit similar to that already traced would be closed. In that instance current would flow as already traced to wire 163, thence by wire 100, prong 93, upper ferrule F, prong 92, wire 101, electrode 103, pole piece 110, electrode 108 to wire 155, after which current would flow through that part of the previously traced circuit beyond wire 155. It is obvious that switch 157 will break the control circuit whenever the loom is stopped by throwing off the shipper handle so that even if the loom should come to rest with a feeler in contact with a ferrule and a vibrator moved to a position to close what would otherwise be a circuit, yet no current would flow.

When the loom is equipped with a dobby the boxes are operated from one of the jacks and there arises only a negligible amount of vibration due to movement of the pattern surface. Under such conditions, the jack J shown in Fig. 14 is connected to the link 117, and lever 126 and cam 132 can be omitted without danger of fluttering at the pole piece or the color selectors.

From the foregoing it will be seen that I have provided a simple form of weft detecting mechanism for multicolor shuttle changing loom wherein electric detectors are secured to the lay and are rendered operative solely by the shifting of the drop boxes, and wherein the use of this kind of detector is not restricted to a 2 and 2 weave but can be used where the stripes of weft consist of a larger number of picks of filling. This result is accomplished by controlling the circuit at two points, one at the detector, and the other at the two-pole switch which is moved by the pattern mechanism. By limiting the time during which the control circuit can be closed to a brief interval just before the empty shuttle becomes active, I avoid likelihood of burning the ferrules F or the feeler prongs by sparking.

It will further be seen that no special delay motion is needed, since the pattern mechanism which must be employed to control the boxes is present and lends itself easily to such delaying of the indication as is necessary. The actual time during which the indication must be retained, that is, between the time that the solenoid is actuated and the start of the upward movement of lever 42 is very short. Also, it will be seen that means are provided to permit the indication of the magazine and the control of its circuits in conjunction with a Knowles head motion in such a way as to avoid any fluttering of the pole piece 110. When using a pattern chain having a repeat of more than two successive high balls the links 150 (Fig. 8a) or their equivalents may be used.

The claims in this divisional application are limited to the features by which irregular or intermittent interruption of a detecting circuit is prevented, the more general features of the invention forming the subject matter of my original application Serial No. 722,549.

Having thus described my invention it will be seen that changes and modifications may be made therein by those skilled in the art without departing from the spirit and scope of the invention as set forth in the claims, and I do not wish to be otherwise limited to the details herein disclosed, but what I claim is:—

1. In a loom, shifting shuttle boxes, pattern mechanism to control the boxes, a pattern chain forming part of the pattern mechanism and having high and low balls, a vibrator lever operatively interposed between said shuttle boxes and said pattern chain, said balls passing under said vibrator lever to effect raising and lowering of said lever, a loom-controlling electric switch operatively connected to and positioned by the vibrator lever, and means acting in timed relation with the chain to prevent substantial vibration of said switch when successive high balls are passing under the vibrator lever.

2. In a loom, shifting shuttle boxes, a series of high and low pattern balls, a vibrator lever to be positioned by said balls and controlling said shuttle boxes, the balls passing under the vibrator lever to effect raising and lowering thereof, a loom-controlling electric switch operatively connected to and positioned by said vibrator lever, and means in addition to the high balls to prevent substantial vibration of the switch when successive high balls are passing under the vibrator lever.

3. In a loom, shifting shuttle boxes, a series of high and low pattern balls, means to move said balls, a vibrator lever positioned by said balls which effect raising and lowering thereof, a loom-controlling electric switch operatively connected to and positioned by the vibrator lever, and means acting in timed relation with the movement of the high and low balls and operatively related to the switch to prevent substantial vibration of said switch when successive high balls are passing under said vibrator lever.

4. In a loom, shifting shuttle boxes, a series of high and low pattern balls, a vibrator lever positioned by said balls and controlling said shuttle boxes, means to move said balls under said vibrator lever to effect raising and lowering thereof, a loom-controlling electric switch operatively connected to and positioned by the vibrator lever, and members between adjacent high balls effective to maintain the vibrator lever in raised position without substantial vibration of the switch when successive high balls are passing under the vibrator lever.

5. In a loom, shifting shuttle boxes, a series of high and low pattern balls, a vibrator lever positioned by said balls and controlling said shuttle boxes, means to move said balls under the vibrator lever to effect raising and lowering thereof, a loom-controlling electric switch operatively connected to and positioned by the vibrator lever, and means periodically operative to prevent substantial vibration of the switch while one high ball is leaving and a succeeding high ball is approaching the vibrator lever.

6. In a loom, shifting shuttle boxes, a series of high and low pattern balls, a vibrator lever positioned by said balls and controlling said shuttle boxes, means to move said balls under said vibrator lever to effect raising and lowering thereof, a loom-controlling electric switch operatively connected to and positioned by the vibrator lever, an arm in said connections, a cam effective to hold said arm from movement when engaged therewith, and means to move said cam alternately into and out of holding position.

7. In a loom, shifting shuttle boxes, a series of high and low pattern balls, a vibrator lever positioned by said balls and controlling said shuttle boxes, means to move said balls under said vibrator lever to effect raising and lowering thereof, a loom-controlling electric switch operatively connected to and positioned by the vibrator lever, an arm in said connections, a cam effective to hold said arm from movement when engaged therewith, and means to move said cam out of position to control said arm while a change in the size of ball passing under said vibrator lever occurs.

8. In a loom, shifting shuttle boxes, a series of high and low pattern balls, a vibrator lever positioned by said balls and controlling said shuttle boxes, means to move said balls under said vibrator lever to effect raising and lowering thereof, a loom-controlling electric switch operatively connected to and positioned by the vibrator lever, an arm in said connections, a segmental cam, and means to move said cam to alternately hold and release said arm in timed relation to the movement of said series of pattern balls.

9. In a loom, shifting shuttle boxes, pattern mechanism to control the boxes, a pattern chain having high and low balls, a vibrator lever along which said balls pass to position said lever, a loom-controlling electric switch, means operatively connecting said lever and switch, and means connected to said first-named means and effective to maintain said switch without substantial vibration while successive balls of the same size pass along the vibrator lever.

RICHARD GREENLEAF TURNER.